(12) United States Patent
Chang et al.

(10) Patent No.: US 7,600,908 B2
(45) Date of Patent: *Oct. 13, 2009

(54) LIGHT SOURCE MODULE AND BACKLIGHT SYSTEM USING THE SAME

(75) Inventors: Shao-Han Chang, Tu-cheng (TW); Fen Chen Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 106 days.

This patent is subject to a terminal disclaimer.

(21) Appl. No.: 11/508,369

(22) Filed: Aug. 23, 2006

(65) Prior Publication Data
US 2007/0189015 A1    Aug. 16, 2007

(30) Foreign Application Priority Data
Feb. 10, 2006    (CN) .................. 2006 1 0033574

(51) Int. Cl.
*F21V 7/04*    (2006.01)
(52) U.S. Cl. .................. 362/623; 362/97.1; 362/609; 362/613; 362/633; 362/634; 361/703; 361/704; 361/707; 361/714; 361/715
(58) Field of Classification Search .................. 362/609, 362/613, 623, 800, 294, 330, 345, 361, 373, 362/511, 580, 633, 634, 97.1; 359/678; 361/703, 361/704, 707, 714, 715, 719; 174/16.3, 17 R; 312/224–227; 349/63, 65
See application file for complete search history.

(56) References Cited

U.S. PATENT DOCUMENTS

| 5,136,483 | A | * | 8/1992 | Schoniger et al. | 362/545 |
| 6,219,117 | B1 | * | 4/2001 | Nagakubo et al. | 349/65 |
| 6,905,214 | B2 | * | 6/2005 | Tani | 353/56 |
| 2001/0017774 | A1 | | 8/2001 | Ito et al. | |
| 2001/0046136 | A1 | * | 11/2001 | Weber et al. | 362/494 |
| 2005/0231983 | A1 | * | 10/2005 | Dahm | 362/800 |
| 2006/0221638 | A1 | * | 10/2006 | Chew et al. | 362/613 |
| 2007/0058368 | A1 | * | 3/2007 | Partee et al. | 362/231 |

FOREIGN PATENT DOCUMENTS

JP    9-311224    12/1997
WO    WO 2005114045 A1 * 12/2005

* cited by examiner

*Primary Examiner*—Sharon E Payne
*Assistant Examiner*—Mary Zettl
(74) *Attorney, Agent, or Firm*—Clifford O. Chi

(57) ABSTRACT

A light source module includes at least a light source and a housing. The housing includes a base having a slanted reflective surface, a plurality of sidewalls extending out of a peripheral of the base cooperatively defining an opening with the base, the sidewall aligned with a trough of the slanted reflective surface having an inner surface and an outer surface opposite to the inner surface, and a plurality of fin structures formed on the outer surface of the sidewall. The light source is fixed on the inner surface of the sidewall. Light rays emitted from the light source being reflected at the slanted reflective surface toward the opening. A backlight system using the light source module is also provided. The present backlight system has a good heat dissipation capability due to an employment of the present light source module, and can be configured to be a thin body.

15 Claims, 4 Drawing Sheets

LIGHT SOURCE MODULE AND BACKLIGHT SYSTEM USING THE SAME

CROSS-REFERENCE TO RELATED APPLICATIONS

This application is related to U.S. Patent Applications, application Ser. No. 11/508,635, filed on Aug. 23, 2006, and entitled "DIRECT TYPE BACKLIGHT MODULE", by Shao-Han Chang; application Ser. No. 11/508,542, filed on Aug. 23, 2006, and entitled "BACKLIGHT MODULE", by Shao-Han Chang; application Ser. No. 11/508,541, filed on Aug. 23, 2006, and entitled "BACKLIGHT SYSTEM", by Shao-Han Chang. Such applications have the same assignee as the present application and have been concurrently filed herewith. The disclosure of the above identified applications is incorporated herein by reference.

TECHNICAL FIELD

The present invention relates to light source modules and backlight systems using the same, more particularly, to a reflective type backlight system for use in, for example, a liquid crystal display (LCD).

BACKGROUND

Most liquid crystal display devices are passive devices in which images are displayed by controlling an amount of light input from an outside light source. Thus, a separate light source (for example, backlight system) is generally employed for illuminating an LCD.

Generally, backlight systems can be classified into an edge lighting type or a bottom lighting type based upon the location of lamps within the devices. The edge lighting type backlight system has a lamp unit arranged at a side portion of a light guiding plate for guiding light. The edge lighting type backlight systems are commonly employed in small-sized LCD due to their lightweight, small size, and low electricity consumption. A bottom lighting type backlight system has a plurality of lamps arranged in regular positions to directly illuminate an entire surface of an LCD panel. The bottom lighting type backlight systems have higher efficiency of light usage than the edge lighting type backlight systems. The bottom lighting type backlight systems are especially used in large-sized LCD devices. However, an LCD device usually employs a significant amount of lamps to reach a high luminance. The significant amount of lamps results in a great deal of heat produced and cumulated inside the LCD device. Therefore, heat dissipation of the direct type backlight systems is usually a hard nut to crack.

Referring to FIG. 7, a typical bottom-lighting backlight system 10 is shown. The backlight system 10 includes a plurality of lamp tubes 110, a light diffusion plate 120, a reflective plate 130, a heat dissipation plate 140, and a frame 150. The frame 150 includes a rectangular base 151 and four connecting sidewalls 153 that extend out from a periphery of the base 153, the base 151 and the sidewalls 153 cooperatively defining a chamber 155. The reflective plate 130 is disposed in the chamber 155 of the frame 150 and separated away from the base 151. The heat dissipation plate 140 is fixed to a bottom surface of the reflective plate 130 facing the base 151. The lamp tubes 110 are aligned above the reflective plate 130 in the chamber 155. The light diffusion plate 120 is positioned on the sidewalls 153 and covers the chamber 155 for diffusing light emitting out of the lamp tubes 110, thus, producing a uniform surface light output.

Heat is efficiently dissipated out from fin structures (not labeled) of the heat dissipation plate 140 via the reflective plate 130, however the heat is still accumulated in the chamber 155. In addition, in order to enhance uniformity of light rays for the backlight system 10, there must be a big space defined between the diffusion plate 120 and the lamp tubes 110 for eliminating potential dark strips caused by the reduced intensity of light between adjacent lamp tubes 110. Therefore, the backlight system 10 suffers from increased thickness and decreased luminance due to the space exiting between the diffusion plate 120 and lamp tubes 110. Furthermore, the thickness of the backlight system 10 is also increased due to an employment of the reflective plate 130 and the heat dissipation plate 140.

What is needed, therefore, is a light source module and backlight system using the same that overcomes the above mentioned shortcomings.

SUMMARY

A light source module according to a preferred embodiment includes a light source and a housing. The housing includes a base having a slanted reflective surface, a plurality of sidewalls extending out of a peripheral of the base cooperatively defining an opening with the base, the sidewall aligned with a trough of the slanted reflective surface having an inner surface facing the slanted reflective surface and an outer surface opposite to the inner surface, and a plurality of fin structures formed on the outer surface of the sidewall aligned with a trough of the slanted reflective surface. The housing further includes a first protruding portion extending perpendicularly from a top of the sidewall towards an inner area of the base and a second protruding portion extending from an interior portion of the first protruding portion towards the base. A side surface of the second protruding portion, and the first protruding portion cooperatively forming a second reflective surface. The side surface of the second protruding portion is adjacent a center of the housing. The light source is fixed on the inner surface of the sidewall. Light rays emitted from the light source are uniformly reflected at the slanted reflective surface toward the opening.

A backlight system according to a preferred embodiment includes at least a light source module and a light diffusion plate. The same light source module as described in previous paragraph is provided. The light source module is positioned under the light diffusion plate. The light diffusion plate diffuses the light emitting from the light source, so as to produce a uniform surface light output.

Other advantages and novel features will become more apparent from the following detailed description of the preferred embodiments, when taken in conjunction with the accompanying drawings.

BRIEF DESCRIPTION OF THE DRAWINGS

Many aspects of the present light source module and backlight system using the same can be better understood with reference to the following drawings. The components in the drawings are not necessarily drawn to scale, the emphasis instead being placed upon clearly illustrating the principles of the present light source module and backlight system using the same. Moreover, in the drawings, like reference numerals designate corresponding parts throughout the several views.

DETAILED DESCRIPTION OF THE PREFERRED EMBODIMENTS

Reference will now be made to the drawings to describe in detail preferred embodiments of the present backlight system using at least a light source module.

Figure 1:
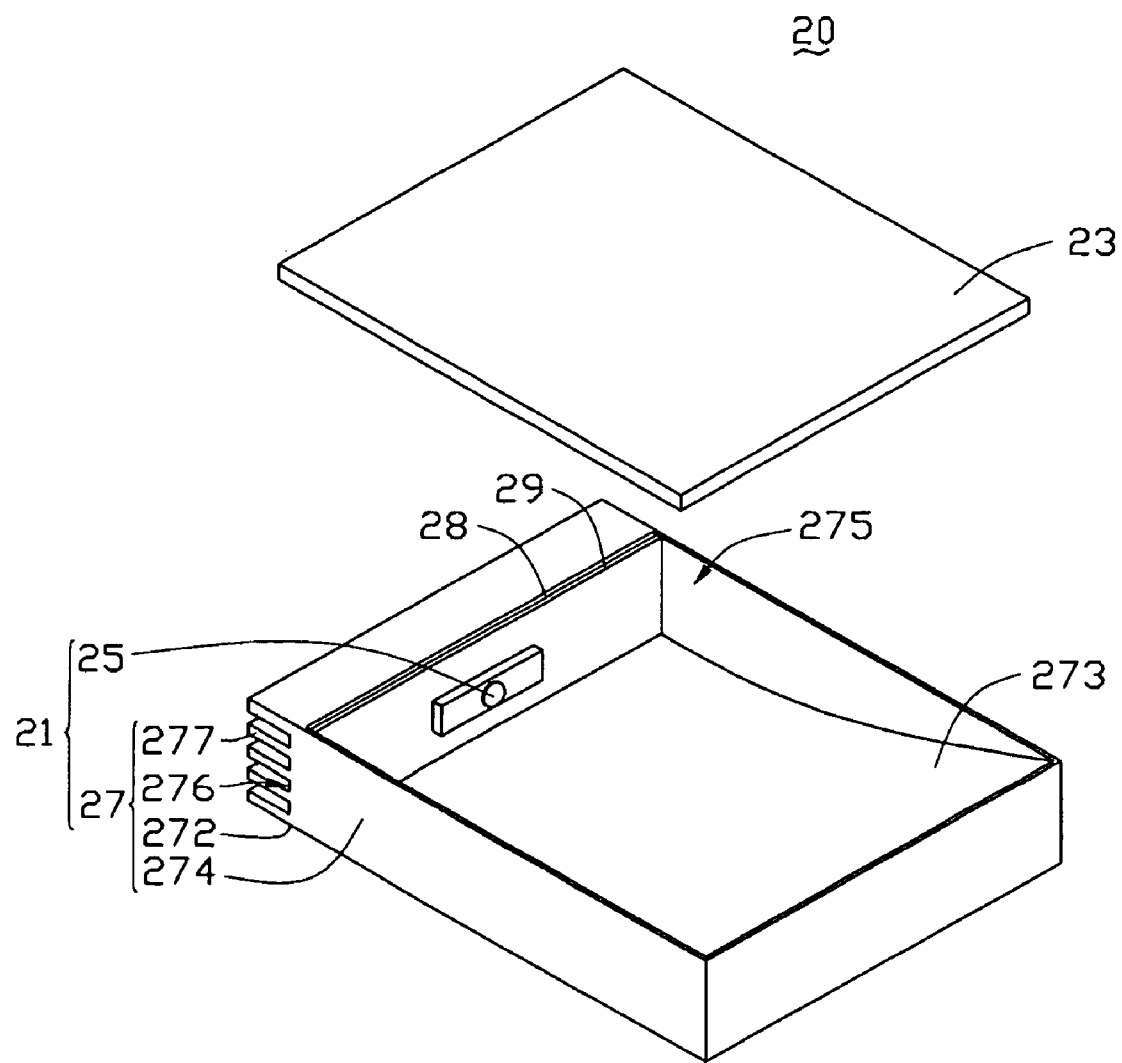
FIG. 1 is a schematic, exploded isometric view of a backlight system according to a first preferred embodiment.
Figure 2:
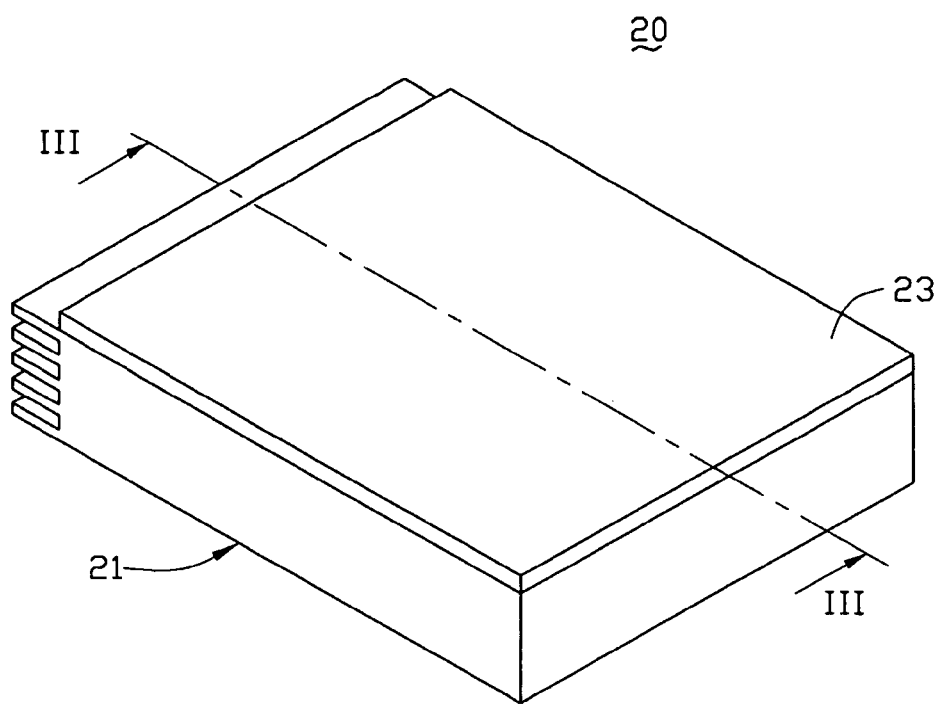
FIG. 2 is a schematic, assembled isometric view of the backlight system of FIG. 1.

Referring to FIG. 1, a backlight system 20 in accordance with a first preferred embodiment is shown. The backlight system 20 includes a light source module 21 and a light diffusion plate 23. The light source module 21 includes a light source 25 and a housing 27. The housing 27 includes a base 272 having a slanted reflective surface 273, a plurality of sidewalls 274 extending out of a peripheral of the base 272 cooperatively defining an opening 275 with the base 272, an inner surface (not labeled) facing the slanted reflective surface 273 on the sidewall 274 aligned with a trough of the slanted reflective surface 273, an outer surface 276 on the sidewall 274 aligned with the trough of the slanted reflective surface 273, and a plurality of fin structures 277 formed on the outer surface 276. The light source 25 is fixed on the inner surface (not labeled) of the sidewall 274. The light diffusion plate 23 is positioned on the light source module 21 and covers the opening 275 of the light source module 21.

Figure 3:
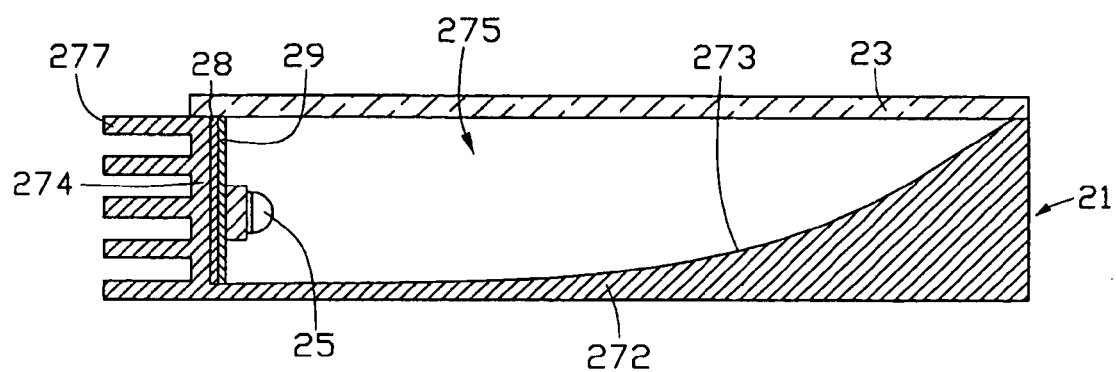
FIG. 3 is a schematic, cross-sectional view taken along a III-III line of FIG. 2.

The base 272 is a rectangular cuneiform plate. The slanted reflective surface 273 is located on an upper surface of the base 272. Light rays emitted from the light source 25 are uniformly reflected by the slanted reflective surface 273 toward the light diffusion plate 23. Referring to FIG. 3, the base 272 of the housing 27 has a cuneiform-shaped cross section taken along a plane perpendicular to the sidewall 274 where the light source 25 is fixed. In this embodiment, the slanted reflective surface 273 is a smooth curved surface facing the diffusion plate 23 and the light source 25. It is to be understood that the slanted reflective surface 273 may also be configured to be a slanted flat surface, a stepped surface or a combination thereof.

The housing 27 may be integrally manufactured. A material of the housing 27 is selected from a group comprising of aluminum, magnesium, copper, their alloys, or other suitable materials having a good heat dissipation coefficient. The light source 25 employs a light emitting diode (LED). It is to be understood that the present light source module may include a plurality of light sources regularly fixed on the inner surface of the sidewall 274 of the housing 27 for improving optical brightness. It is also to be understood that the light sources of the present light source module can also be a cold cathode fluorescent lamp.

Referring also to FIG. 1 or FIG. 3, in order to improve heat dissipation capability of the backlight system 20, the light source module 21 further includes a first heat conductive layer 28 and an aluminum based printed circuit board 29 (PCB sandwiched in that order between the light source 25 and the inner surface of the sidewall 274. The light source 25 is fixed on the aluminum based PCB 29. It is to be understood that the light source module 21 may further include a second heat conductive layer (not shown) sandwiched between the aluminum base PCB 29 and the light source 25.

In use, light rays from the light source 25 can be uniformly reflected into the diffusion plate 23 by the slanted reflective surface 273 of the base 272. Heat produced by the light source 25 can be efficiently dissipated out from the fin structures 277 via the first heat conductive layer 28 and the aluminum based PCB 29. In addition, because the light source 25 is positioned under one edge of the diffusion plate 23, light rays from the light source 25 avoids directly entering into the diffusion plate 23, thereby the present backlight system could configure to be a thin body easily.

Figure 4:
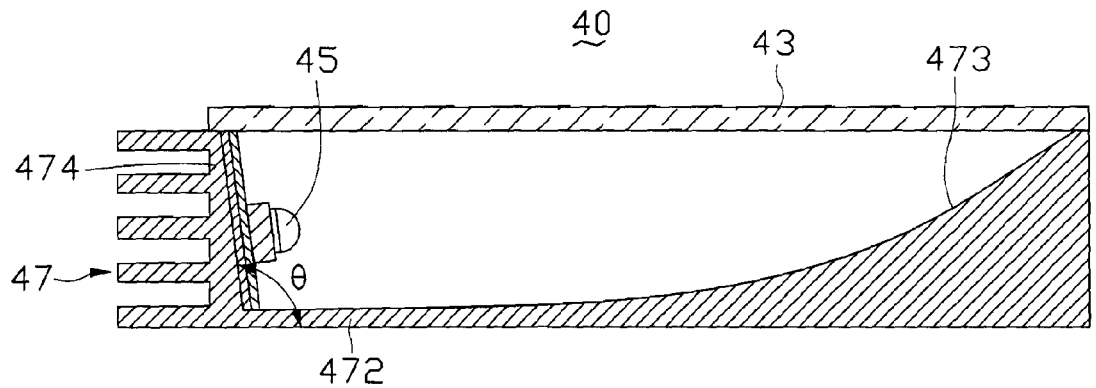
FIG. 4 is a schematic, cross-sectional view of a backlight system according to a second preferred embodiment.

Referring to FIG. 4, a backlight system 40 in accordance with a second preferred embodiment is shown. The backlight system 40 is similar in principle to that of the first embodiment, except that an inner surface (not labeled) of the sidewall 474 of the housing 47 is slanted outwards with respect to a base 472 of the housing 47. An inclination angle θ defined by the inner surface of the sidewall 474 with respect to the horizontal portion of the base 472 is chosen to be about 100 degrees. A curvature of a slanted reflective surface 473 of the base 472 is chosen based upon a positioning of light source 45, thereby reflecting light rays emitted from the light source 45 uniformly into the diffusion plate 43. It is noted that, an inclination angle of the inner surface of the sidewall with respect to the base is not limited to the illustrated embodiment. The inclination angle in the range between the open interval of 30 degrees and 150 degrees should be considered to be within the scope of the present invention.

Figure 5:
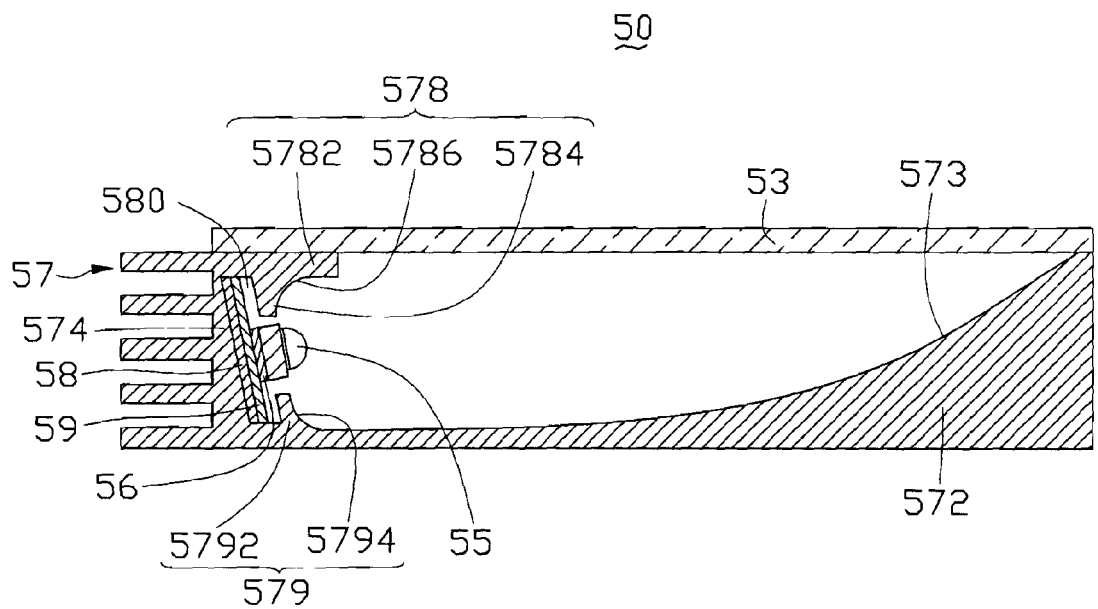
FIG. 5 is a schematic, cross-sectional view of a backlight system according to a third preferred embodiment.

Referring to FIG. 5, a backlight system 50 in accordance with a third preferred embodiment is shown. The backlight system 50 is similar in principle to that of the second embodiment, except that a housing 57 further includes an upper reflective portion 578 and a bottom reflective portion 579. The upper reflective unit 578 is positioned on a top of the sidewall 574 where a light source 55 is fixed. The upper reflective unit 578 includes a first protruding portion 5782 extending perpendicularly from a top the sidewall 574 towards an inner area of the base 572 and a second protruding portion 5784 extending from an interior portion of the first protruding portion 5782 towards the base 572, the first protruding portion 5782 and the second protruding portion 5784 cooperatively forming a second reflective surface 5786 that is a concave surface between two exposing longitudinal edge of the first protruding portion 5782 and the second protruding portion 5784 facing a slanted reflective surface 573 of the base 572. The second reflective surface 5786 is a curved surface. Light rays from the light sources 55 projected at the second reflective surface 5786 are reflected toward the slanted reflective surface 573, and finally reflected again into the light diffusion plate 53.

The bottom reflective unit 579 is positioned on the base 572 adjacent to the sidewall 574 that fixes the light source 55 thereon. The bottom reflective unit 579 includes a third protruding portion 5792 extending from the base 572 toward the light diffusion plate 53, the third protruding portion 5792 and the base 572 cooperatively forming a third reflective surface 5794 interconnecting the slanted reflective surface 573. The third reflective surface 5794 is a curved surface. The sidewall 574, the second protruding portion 5784, and the third protruding portion 5792 cooperatively define a chamber 580 to receive the light source 55. Similar to the backlight system 20, the backlight module 50 includes a first heat conductive layer 58 and an aluminum based printed circuit board 59 sandwiched in that order between the light source 55 and the inner surface of the sidewall 574. The backlight module 50 further includes a second heat conductive layer 56 sandwiched between the aluminum base printed circuit board 59 and the light source 55.

In use, some light rays from the light source 55 are directly projected onto the light diffusion plate 53, other light rays from the light source 55 are reflected by the, before finally projecting into the light diffusion plate 53. Accordingly, a light energy utilization rate is increased. It is to be understood that curvature of the slanted reflective surface 573, second and third reflective surfaces 5276, and 5794 may all be adjusted, so as to attain a good optical performance.

Figure 6:
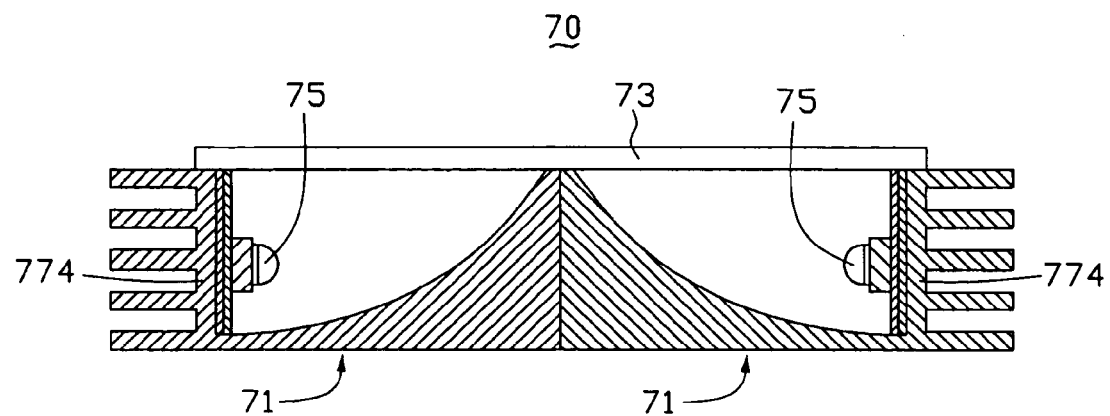
FIG. 6 is a schematic, cross-sectional view of a backlight system according to a fourth preferred embodiment.
Figure 7:
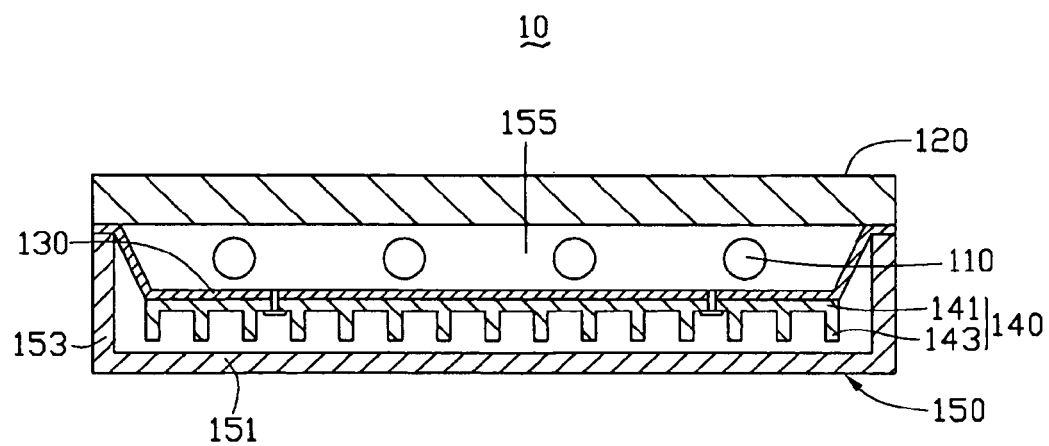
FIG. 7 is a schematic, cross-sectional view of a conventional backlight system.

Referring to FIG. 6, a backlight system 70 in accordance with a fourth preferred embodiment is shown. The backlight system 70 includes a light diffusion plate 73 and two light source module 71 disposed under the light diffusion plate 73. Each light source module 71 is similar in principle to the light source module 21 of the first embodiment, except that size of the light source module 71 is different. The two light source module 71 are back to back of each other, such that each sidewall 774 where a light source 75 is fixed is disposed at an adjacent the edge of the light diffusion plate 73.

It is to be understood that the present backlight system may further include a highly reflective film deposited on the slanted reflective surface of the base or on the second and third reflective surfaces of the upper and bottom reflective units, for improving the light energy utilization rate. It is noted that the base of the present light source module can be configured to be a hollow structure for decreasing its weight.

The present backlight system has a good heat dissipation capability due to an employment of the present light source module, and can be configured to be a thin body. In addition, it should be pointed out that the numbers and sizes of the light source module of the present backlight system are not limited to be illustrated embodiment. The present backlight system employing at least a light source module, should be considered to be within the scope of the present invention. As a result, adjusting the size of the backlight system can be done easily and conveniently by assembling or disassembling a number of the light source modules and choosing a suitable size of the light diffusion plate to cover the light source modules.

Finally, while the present invention has been described with reference to particular embodiments, the description is illustrative of the invention and is not to be construed as limiting the invention. Therefore, various modifications can be made to the embodiments by those skilled in the art without departing from the true spirit and scope of the invention as defined by the appended claims.

What is claimed is:

1. A light source module comprising:
   at least one light source; and
   a housing having:
      a base having a slanted reflective surface; and
      a plurality of sidewalls extending out of a peripheral of the base cooperatively defining an opening with the base, the sidewall aligned with a trough of the slanted reflective surface having an inner surface facing the slanted reflective surface and an outer surface opposite to the inner surface, the at least one light source being fixed on the inner surface, and a plurality of fin structures formed on the outer surface of the sidewall, light rays emitted from the light source being reflected at the slanted reflective surface toward the opening, wherein the housing further comprises a first protruding portion extending substantially perpendicularly from a top of the sidewall towards an inner area of the base and a second protruding portion extending from an interior portion of the first protruding portion towards the base, the second protruding portion having a first side surface facing the sidewall that fixes the at least one light source thereon, and a second side surface facing away from the first side surface; the second side surface and the first protruding portion cooperatively forming a second curved reflective surface facing the base.

2. The light source module according to claim 1, wherein the slanted reflective surface is configured to be one of a curved surface, a slanted flat surface, a stepped surface or a combination thereof.

3. The light source module according to claim 1, wherein the inner surface of the sidewall where the light source is fixed, is slanted with respect to a horizontal portion of a base.

4. The light source module according to claim 3, wherein an inclination angle defined by the inner surface of the sidewall that fixes the light source thereon with respect to the base is configured to be in a range from about 30 degrees to about 150 degrees.

5. The light source module according to claim 1, wherein the housing further comprises a bottom reflective unit positioned on the base adjacent to the sidewall that fixes the light source thereon, the bottom reflective unit having a third protruding portion extending from the base toward the opening of the housing and spaced apart from the sidewall that fixes the light source thereon, the third protruding portion and the base cooperatively forming a third curved reflective surface interconnecting the slanted reflective surface.

6. The light source module according to claim 1, wherein the light source is selected from one of light emitting diode and cold cathode fluorescent lamp.

7. The light source module according to claim 1, wherein a material of the housing is selected from a group comprising of aluminum, magnesium, copper or their alloys.

8. The light source module according to claim 1, wherein the housing further comprises a first heat dissipation layer and an aluminum based printed circuit board sandwiched between the light source and the inner surface of the sidewall.

9. The light source module according to claim 8, wherein the housing further comprises a second heat conductive layer sandwiched between the aluminum base printed circuit board and the light source.

10. The light source module according to claim 1, wherein the housing further comprises a highly reflective film deposited on the slanted reflective surface of the base.

11. A backlight system comprising:
    a light diffusion plate; and
    at least one light source module disposed under the light diffusion plate, each light source module having:
       at least a light source; and
       a housing having a base having a slanted reflective surface, a plurality of sidewalls extending out of a peripheral of the base cooperatively defining an opening with the base, the sidewall aligned with a trough of the slanted reflective surface having an inner surface facing the slanted reflective surface and an outer surface opposite to the inner surface, the at least one light source being fixed on the inner surface, and a plurality of fin structures formed on the outer surface of the sidewall, light rays emitted from the light source being reflected at the slanted reflective surface toward the opening, wherein the housing further comprises a first protruding portion extending substantially perpendicularly from a top of the sidewall towards an inner area of the base and a second protruding portion extending from an interior portion of the first protruding portion towards the base, the second protruding portion having a first side surface facing the sidewall that fixes the at least one light source thereon, and a second side surface facing away from the first side surface; the second side surface and the first protruding portion cooperatively forming a second curved reflective surface facing the base.

12. The backlight system according to claim 11, wherein the slanted reflective surface is configured to be one of a curved surface, a slanted flat surface, a stepped surface or a combination thereof.

13. The backlight system according to claim 11, wherein the inner surface of the sidewall where the light source is fixed, is slanted with respect to the base.

14. The backlight system according to claim 11, wherein the housing further comprises a bottom reflective unit positioned on the base adjacent to the sidewall that fixes the light source thereon, the bottom reflective unit having a third protruding portion extending from the base toward the opening of the housing and spaced apart from the sidewall that fixes the light source thereon, the third protruding portion and the base cooperatively forming a third curved reflective surface interconnecting the slanted reflective surface.

15. The backlight system according to claim 11, wherein the backlight system comprises two same light source modules disposed under the light diffusion plate, the two light source modules being back to back of each other, such that each sidewall where the tight source is fixed is disposed at an adjacent the edge of the light diffusion plate.

* * * * *

UNITED STATES PATENT AND TRADEMARK OFFICE
CERTIFICATE OF CORRECTION

| | |
|---|---|
| PATENT NO. | : 7,600,908 B2 |
| APPLICATION NO. | : 11/508369 |
| DATED | : October 13, 2009 |
| INVENTOR(S) | : Shao-Han Chang and Fen Chen |

It is certified that error appears in the above-identified patent and that said Letters Patent is hereby corrected as shown below:

Title page, item (75) regarding "Inventors" on the front page of the Patent should read:

(75) Inventors: Shao-Han Chang, Tu-Cheng (TW); Fen Chen, Shenzhen (CN).

Signed and Sealed this
Twelfth Day of July, 2011

David J. Kappos
*Director of the United States Patent and Trademark Office*